June 25, 1963 C. F. CROMER ETAL 3,095,490
CIRCUIT INTERRUPTERS
Filed Feb. 26, 1960 9 Sheets-Sheet 1

June 25, 1963 C. F. CROMER ETAL 3,095,490
CIRCUIT INTERRUPTERS
Filed Feb. 26, 1960 9 Sheets-Sheet 4

June 25, 1963 C. F. CROMER ETAL 3,095,490
CIRCUIT INTERRUPTERS
Filed Feb. 26, 1960 9 Sheets-Sheet 9

United States Patent Office 3,095,490
Patented June 25, 1963

3,095,490
CIRCUIT INTERRUPTERS
Charles F. Cromer, Penn Township, Westmoreland County, Jerome Sandin, Forest Hills, and Benjamin P. Baker, deceased, late of Monroeville, Pa., by Mellon National Bank and Trust Company, executor, Pittsburgh, Pa., assignors to Westinghouse Electric Corporation, East Pittsburgh, Pa., a corporation of Pennsylvania
Filed Feb. 26, 1960, Ser. No. 11,175
11 Claims. (Cl. 200—148)

This invention relates to circuit interrupters in general, and, more particularly, to circuit interrupters of the fluid-blast type.

A general object of the invention is to provide an improved and highly effective circuit interrupter, which is self-contained, relatively inexpensive, and non-demonstrative when interrupting power circuits.

A more specific object of the present invention is to provide an improved self-contained puffer-type fluid-blast circuit interrupter, in which the operation of the puffer mechanism is associated with movement of the movable contact.

Another object of the present invention is to provide a compact highly effective circuit interrupter, suitable for three-pole application, and which may be wheeled into a cubicle compartment.

Another object of the present invention is to associate a puffer mechanism with the relatively stationary contact of a circuit interrupter.

Another object of the invention is to provide an improved fluid-blast circuit interrupter in which the separation of the separable contact structure is deliberately delayed until the attainment of a predetermined gaseous pressure within a pressure chamber, the gas flowing under pressure out of an orifice through which the arc is drawn. This has the additional advantage of permitting a previous parting of external main contacts, when the latter are employed, as well as providing higher contact velocity.

Yet a further object of the present invention is to provide an improved circuit interrupter involving relatively few parts, of sturdy construction and also of compact size, in which a blast of fluid is generated within a puffer mechanism associated with the movable contact operating mechanism to effectively extinguish the established arc.

Another object is to provide an improved orifice and separable contact arrangement, coupled with a puffer device, in which improved blast pressure through the orifice results.

Further objects and advantages will readily become apparent upon reading the following specification, taken in conjunction with the drawings, in which.

Figure 1:
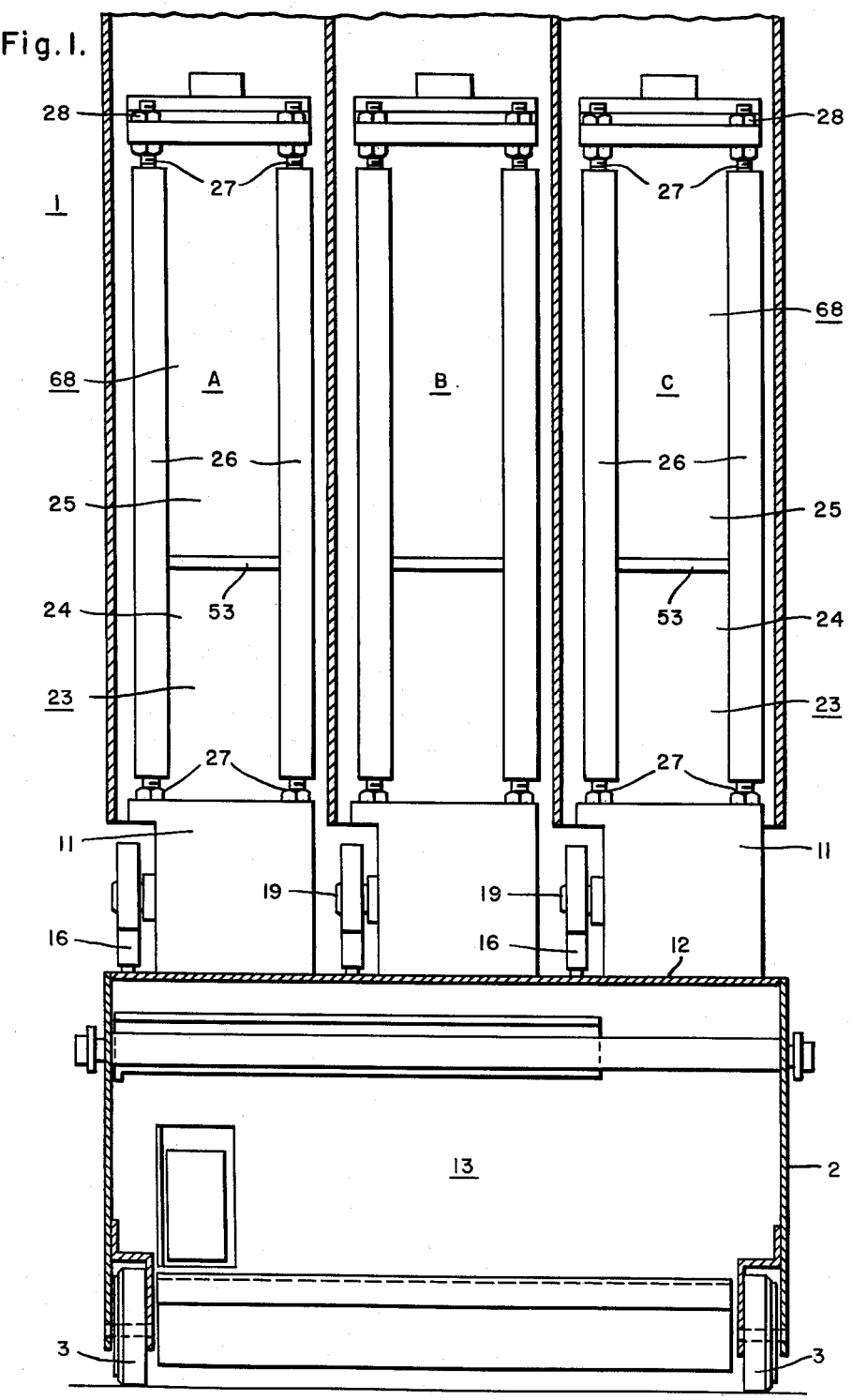
FIG. 1 is a front elevational view of a three-pole circuit interrupter embodying the principles of the present invention, and the contact structure being illustrated in the closed-circuit position.
Figure 2:
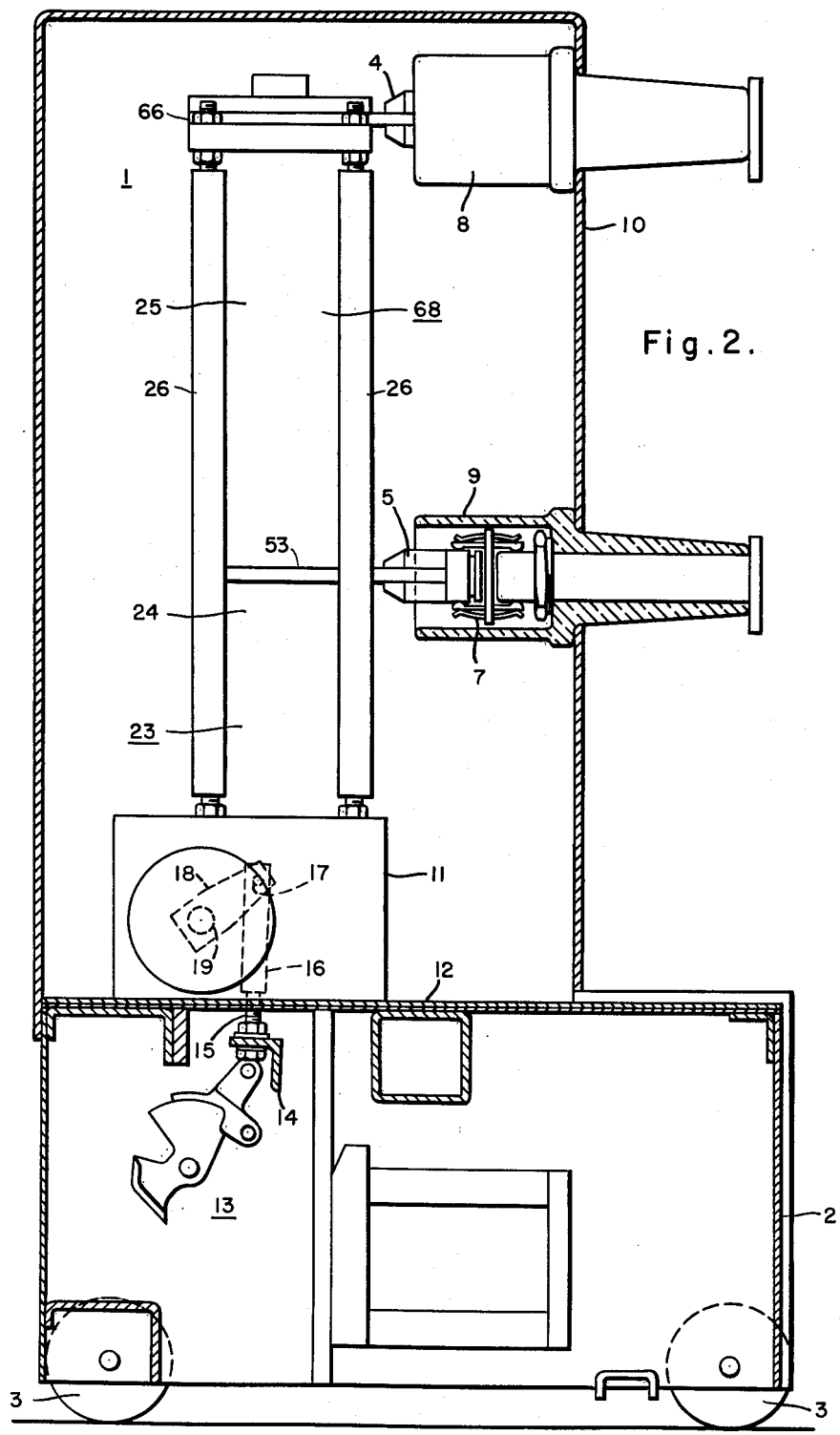
FIG. 2 is a side elevational view of the three-pole circuit-interrupting structure illustrated in FIG. 1, again the contact structure being illustrated in the closed-circuit position.
Figure 3A:
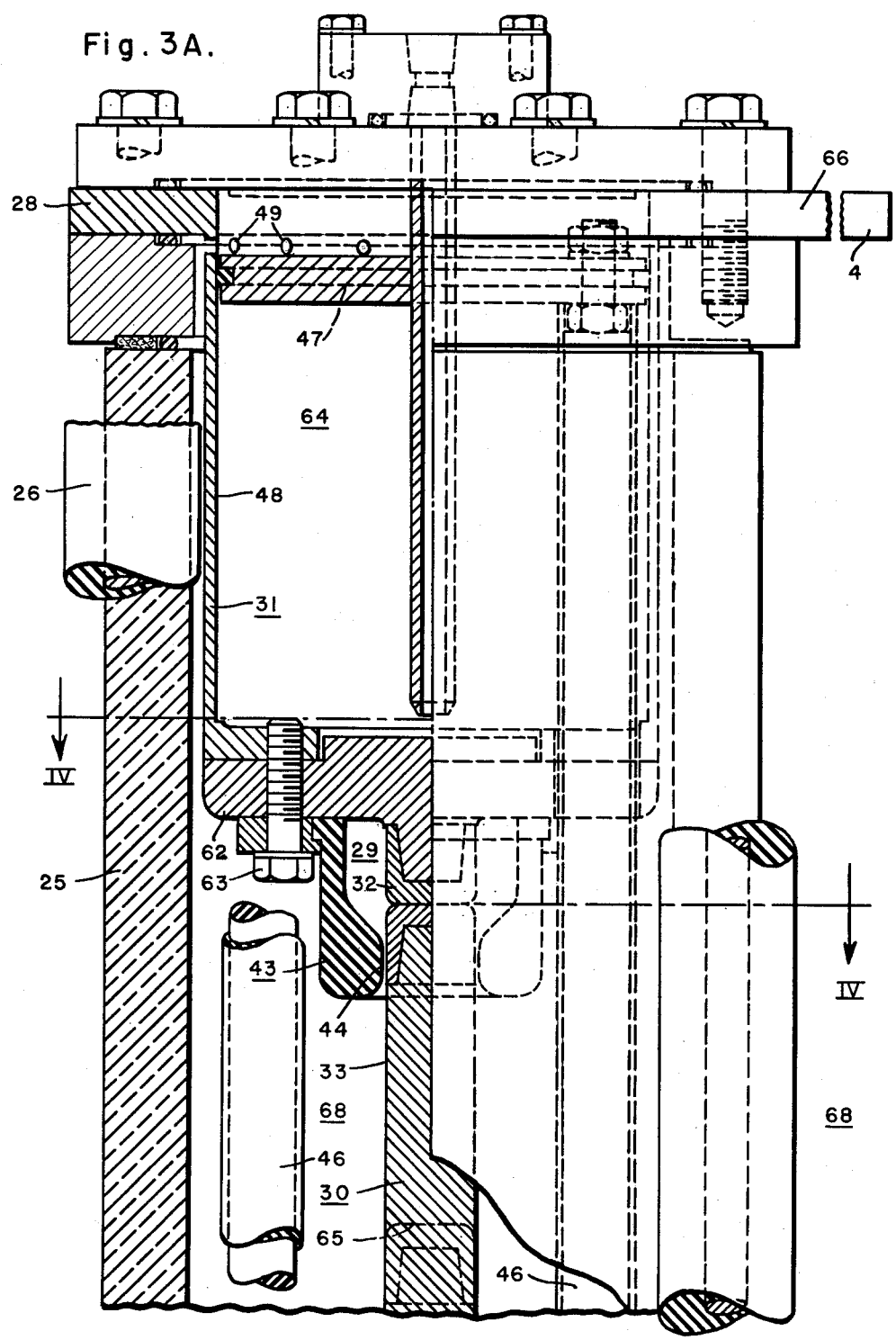
Figure 3B:
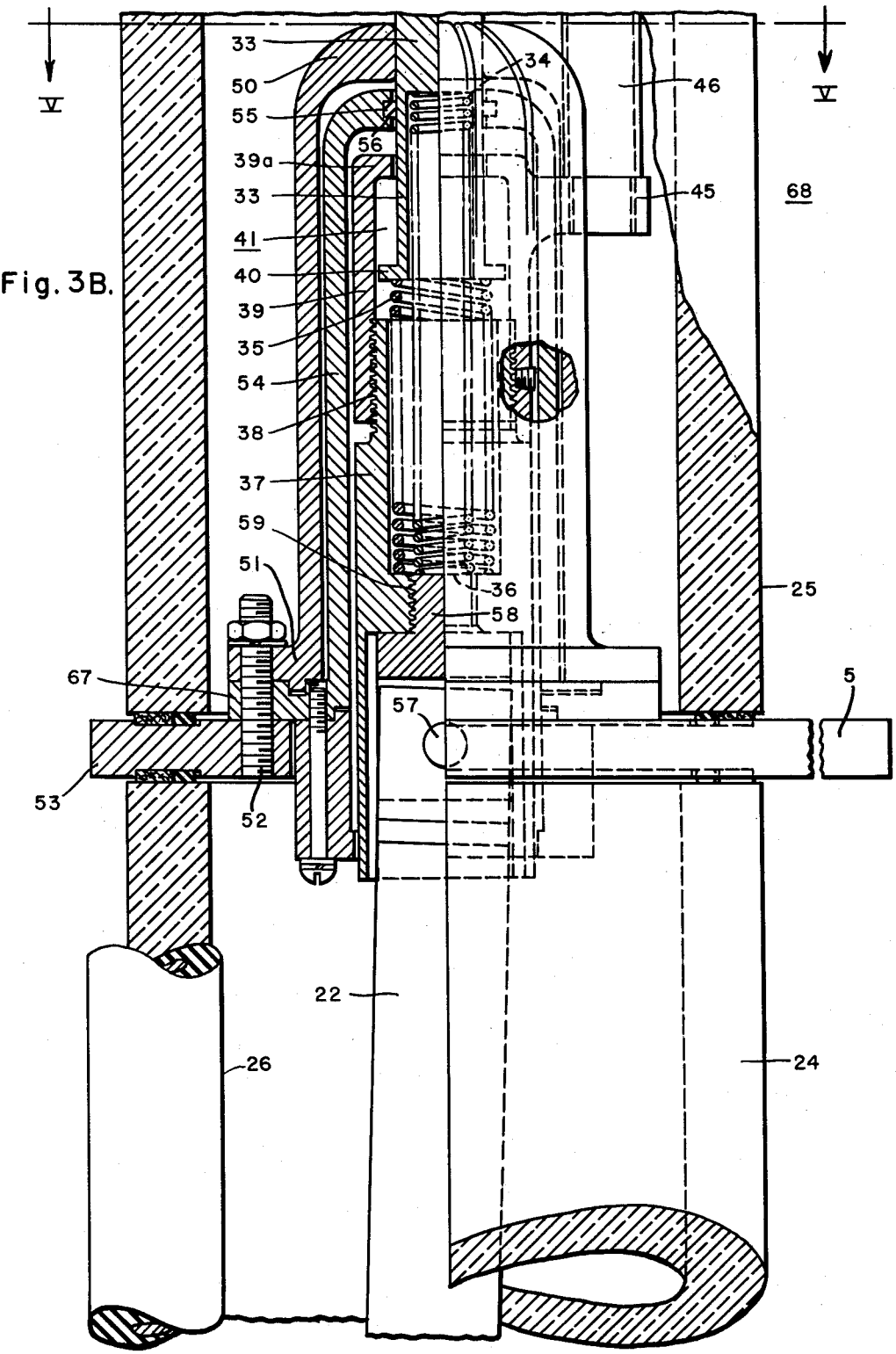
Figure 3C:
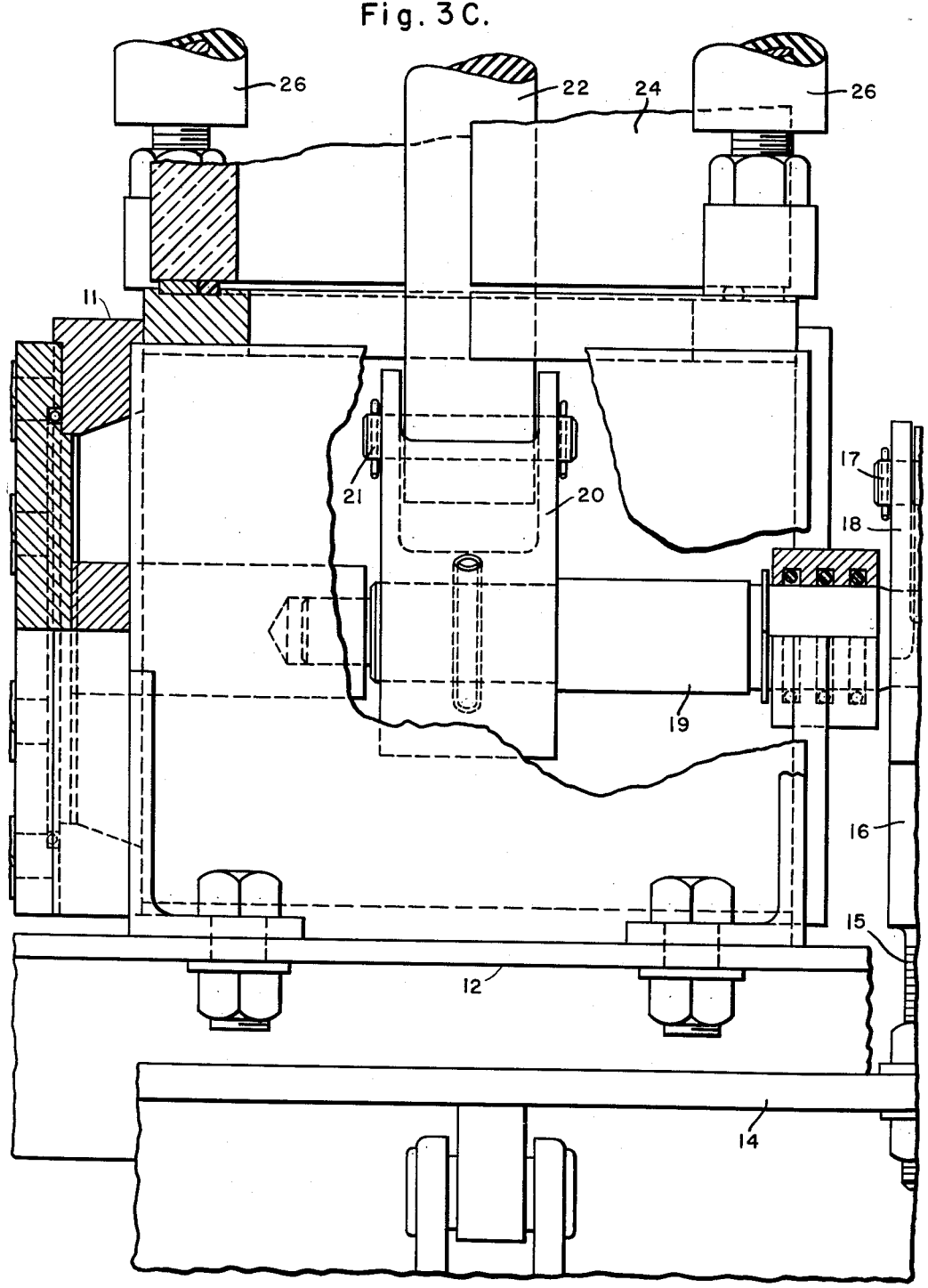
Figure 4:
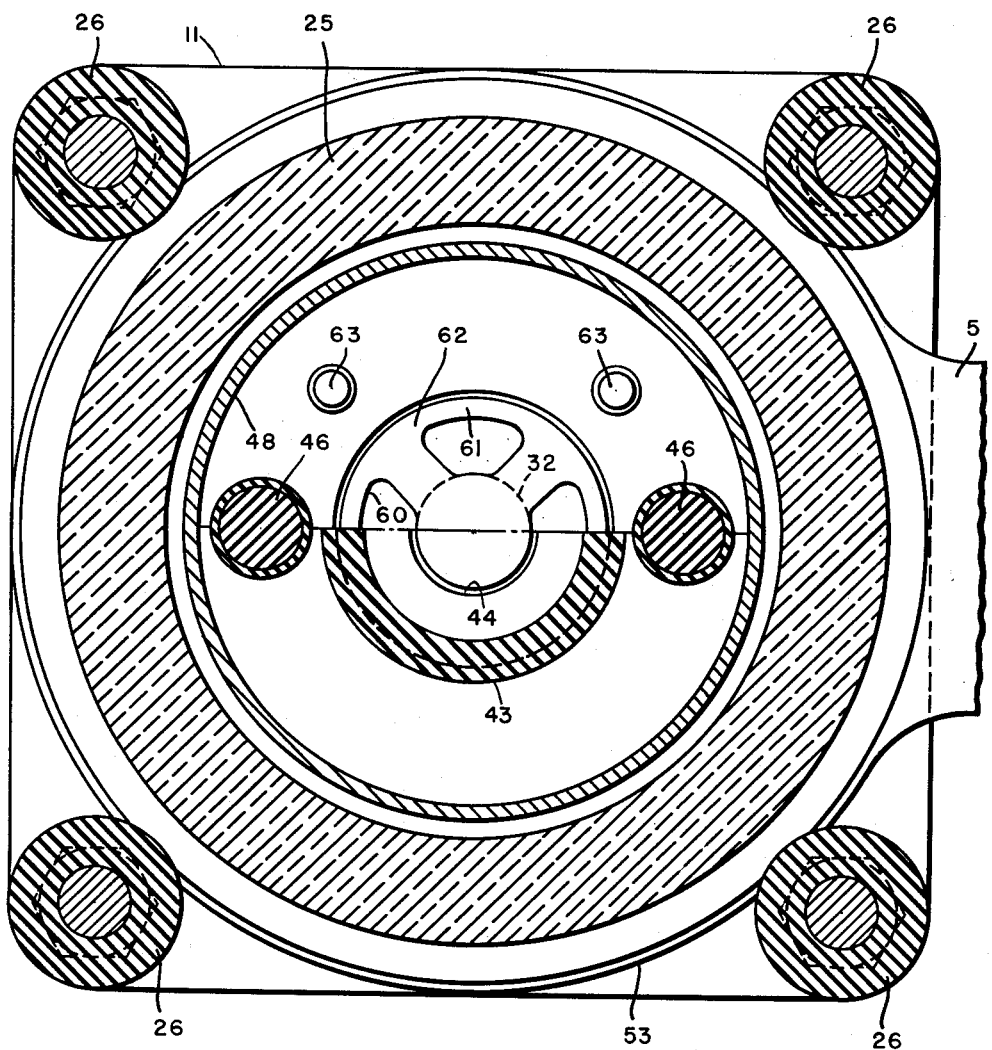
Figure 5:
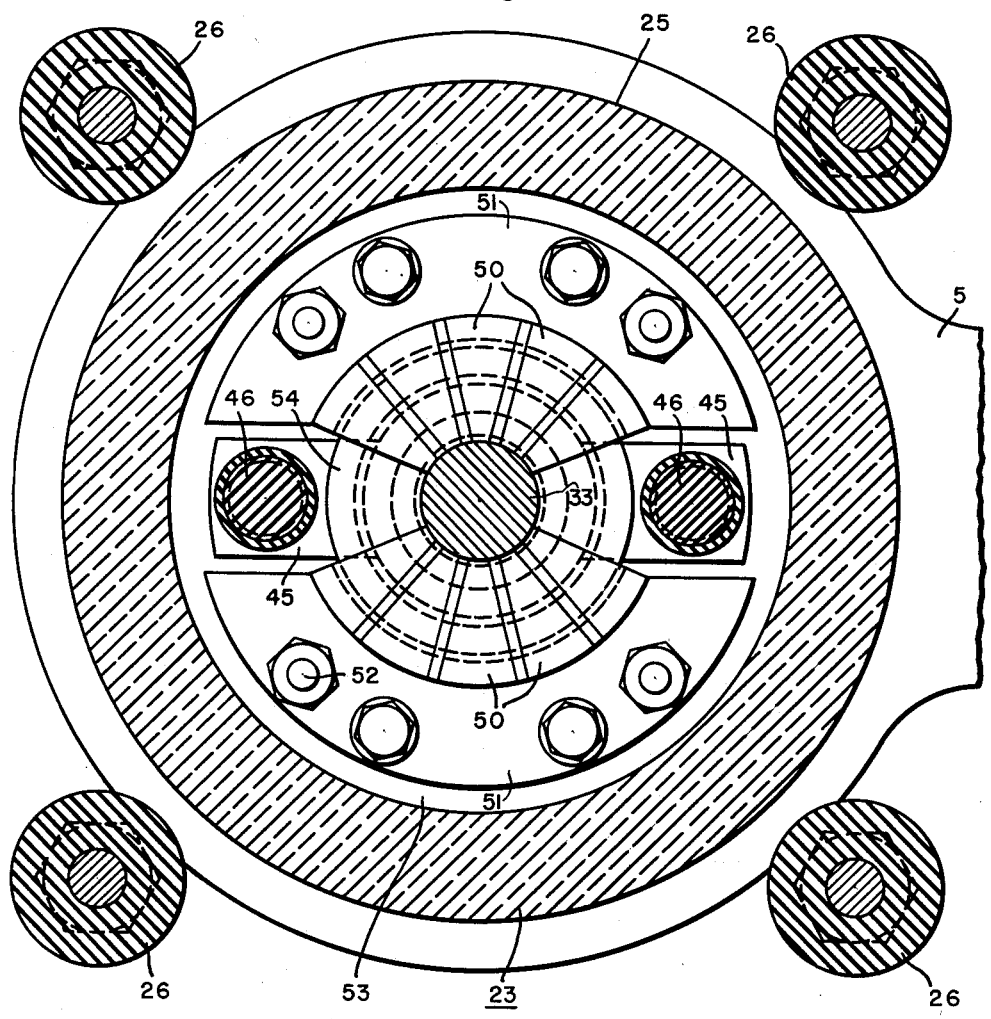
Figure 6:
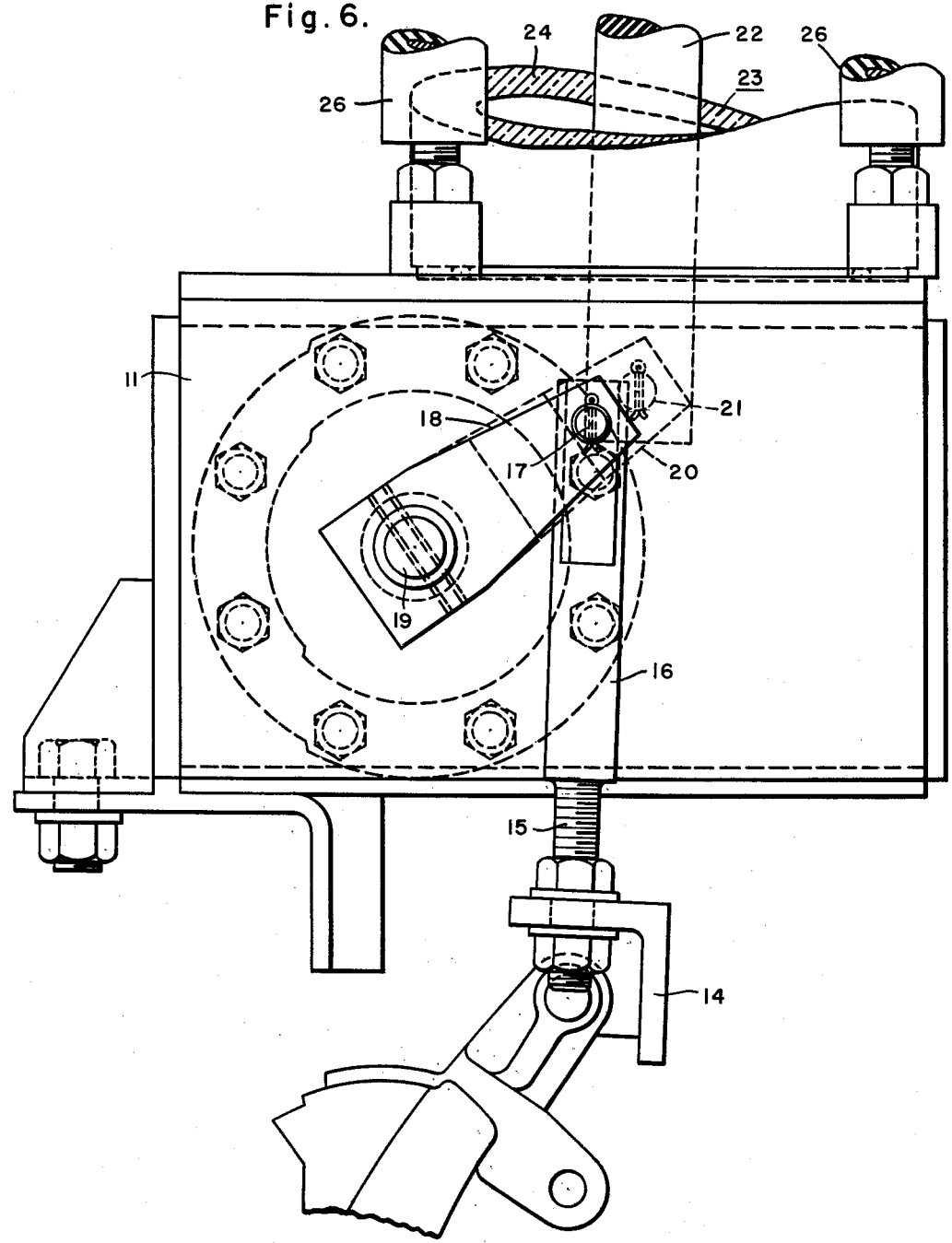
Figure 7:
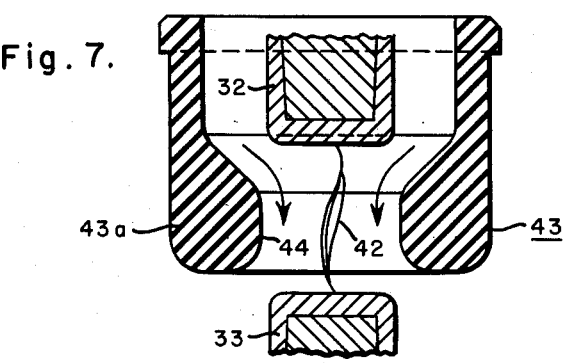
Figure 8:
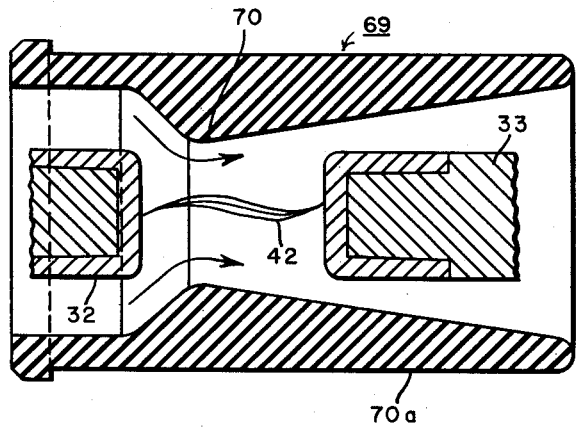
Figure 9:
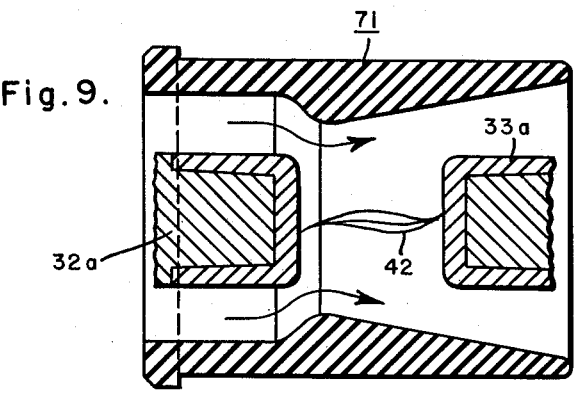

FIGS. 3A, 3B and 3C collectively illustrate a longitudinal vertical sectional view taken through the improved interrupting structure of one of the pole-units illustrated in FIGS. 1 and 2, with the contact structure shown in the closed-circuit position;

FIG. 4 is a broken sectional view taken substantially along the line IV—IV of FIG. 3A;

FIG. 5 is a sectional view taken substantially along the line V—V of FIG. 3B;

FIG. 6 is a side elevational view of the mechanism housing illustrated in FIG. 3C;

FIG. 7 is an enlarged view of the orifice structure and the relative location of the separable contacts during an intermediate part of the opening operation, the orifice structure being that employed in the interrupting structure of FIG. 3A;

FIG. 8 illustrates a modified type of orifice structure, which has produced highly effective results, again the contact structure being illustrated in the partly open-circuit position; and, FIG. 9 illustrates still a further modified type of orifice construction which has proved to be effective.

Referring to the drawings, and more particularly to FIG. 1 thereof, the reference numeral 1 generally designates a three-pole circuit interrupter adapted for truck-mounting, and arranged to be rolled laterally within a cubicle compartment in metal-clad switchgear, as well known by those skilled in the art. FIG. 2 shows more clearly how the truck 2, mounted upon wheels 3, may be rolled laterally so that movable disconnecting contacts 4, 5 may be separably engaged with relatively stationary disconnecting contacts 7. The stationary disconnecting contact fingers 7 are supported within terminal-bushing structures 8, 9 supported upon a vertical panel 10 associated with the metal-clad switchgear compartment, not shown.

Again with reference to FIG. 1, it will be noted that three pole-units A, B, C are supported, in an upstanding manner. Each of the pole-units is supported, as shown, by a mechanism housing 11, the latter, in turn, being supported upon the upper panel 12 of a mechanism compartment, generally designated by the reference numeral 13.

Disposed interiorly within the mechanism compartment 13 is a mechanism, which is arranged to simultaneously effect the actuation of the three pole-units A, B and C. Generally, the mechanism is arranged to be closed by solenoid action, tensioning thereby a plurality of opening accelerating springs, latched in the closed position, and adapted to be unlatched during the opening operation. The plurality of opening accelerating springs effect downward opening movement of an angle-shaped cross brace 14 (FIG. 2), which has attached thereto by means of bolts 15, three pull rods 16, each of which is pivotally connected, as at 17, to a crank-arm 18. The crank-arm 18 is operable to effect, during opening, clockwise rotation of an operating shaft 19, as viewed in FIG. 2, to effect the corresponding clockwise rotation of an internally disposed crank-arm 20 (FIG. 6), which is pivotally connected, as at 21, to an insulating operating rod 22, which extends upwardly within the tubular housing structure, generally designated by the reference numeral 23.

The tubular housing structure 23 generally includes a pair of insulating tubes 24, 25, preferably formed from a suitable weatherproof material, such as porcelain. As more clearly shown in FIG. 2, the upper porcelain casing 25 is disposed between the terminals 4, 5 associated with each of the three pole-units A, B and C.

With reference to FIGS. 1 and 2, it will be observed that a plurality of longitudinally extending tension rods 26, composed of a suitable insulating material, are employed to effect compression of the insulating casing structure 23. As shown, the insulating tension rods 26 have rod ends 27 associated therewith, which are threaded, and accommodate nuts 28, which maintain the rods 26 under tension and the insulating casing structure 23 under compression.

With reference to FIG. 3A of the drawings, it will be noted that the upper porcelain casing 25 encloses a relatively stationary contact structure, generally designated by the reference numeral 29, and a movable contact structure, generally designated by the reference numeral 30. A puffer mechanism, generally designated by the reference numeral 31, is associated with the relatively stationary contact structure 29 and serves to support the same.

The relatively stationary contact structure 29 includes a relatively stationary butt contact 32 cooperable with a movable rod-shaped contact 33, the latter being biased upwardly, in a contact-closing direction, by a battery of compression springs 34, 35. The upper ends of the compression springs 34, 35 bear against the lower end of the movable rod-shaped contact 33, as illustrated in FIG. 3B.

The lower ends of the compression springs 34, 35 seat within a recess 36 provided within an actuating sleeve 37. Threadedly secured, as at 38, to the upper end of the actuating sleeve 37 is an inverted cup-shaped actuating sleeve 39, having an upper, inwardly-extending flange portion 39a. During the opening operation, the flange portion 39a strikes a lower outwardly extending flange portion 40, formed at the lower end of the movable rod-shaped contact 33. As shown, a lost-motion connection 41 is provided, so that initially, during the opening operation, the actuating sleeve 39 moves downwardly with the operating rod 22, the relatively movable rod-shaped contact 33 remaining stationary at this time in abutting engagement with the relatively stationary contact 32. Following a predetermined opening movement of the insulating operating rod 22 and the actuating sleeve 37, the flange portion 39a is effective to pick up the lower flange portion 40, integrally formed with the movable contact rod 33, and to forcibly move the same downwardly, thereby effecting separation between the relatively stationary and movable contacts 32, 33, drawing an arc 42 through an orifice structure, generally designated by the reference numeral 43.

The orifice structure 43 is more clearly illustrated in FIG. 7 of the drawings, where the position of the arc 42 in relation to the orifice opening 44 is more clearly illustrated.

As shown in FIG. 3B, the actuating sleeve 39 has a pair of diametrically-extending boss portions 45, within which are threaded insulating piston rods 46, the upper ends of which are fixedly secured to the diametrically opposed sides of a puffer piston 47, of disc shape, which is vertically movable within an operating puffer cylinder 48, which also serves to support the relatively stationary contact structure 29.

As shown, the upper end of the operating puffer cylinder 48 has a plurality of apertures 49 (FIG. 3A) provided therein to prevent cavitation during opening, or a raising of pressure during closing upon the top side of the puffer piston 47.

As shown in FIG. 3B, a cluster of radially inwardly biased relatively stationary contact fingers 50 bear upon the sides of the movable contact rod 33 and transmit current therefrom. The several contact fingers 50 are connected together at their lower ends at an outwardly extending flange portion 51, which is secured, by a plurality of bolts 52, to a terminal plate 53. The movable disconnecting contact 5' constitutes, as shown, a lateral extension of the terminal plate 53.

Assisting in the vertical guiding motion of the movable rod-shaped contact 33 is a split guide sleeve 54, the upper end of which has an annular recess 55 (FIG. 3B) within which is disposed a guide ring 56. The guide ring 56, through which the movable contact 33 passes, assists in guiding the movable contact 33 during its opening and closing motions.

As shown in FIG. 3B, the upper end of the insulating operating rod 22 is pivotally connected, by a pivot pin 57, to a coupling 58, the latter being threadedly connected, as at 59, to the actuating sleeve 37.

With reference to FIG. 4, it will be observed that apertures 60, 61 are associated with a contact plate 62, secured by bolts 63 to the lower end of the puffer operating cylinder 48. The apertures 61, 60 permit the ready passage of compressed fluid out of the piston cylinder 48 below the piston 47 when the latter is forcibly driven downwardly by the downward movement of the two piston rods 46.

During the opening operation, the actuating mechanism, which is disposed within the mechanism compartment 13, is effective to cause downward opening movement of the angle-shaped actuating bar 14 (FIG. 2). The mechanism may be of any suitable type, but is preferably of the type set forth and claimed in United States Patent 2,515,994 issued July 18, 1950, to Joseph D. Findley, Alvin W. Ogg and Fred E. Florschutz, and assigned to the assignee of the instant application. This mechanism is preferably powerful enough to insure piston operation in the face of heavy back-pressure forces exerted by arcing upon the piston.

The downward opening movement of the angular cross-bar 14 effects, through the linkage 16, clockwise rotation of the crank arm 17, as viewed in FIG. 2. This causes clockwise rotation of the operating shaft 19 (FIG. 3C) and corresponding clockwise rotation of the internally disposed crank-arm 20. Through the pivotal connection at 21, the insulating operating rod 22 is forced downwardly to cause, through the actuating sleeve 37, and lugs 45, downward movement of the two piston rods 46. The piston rods 46, being attached at their upper ends to the piston 47, forcibly drive the piston 47 downwardly compressing thereby fluid within the pressure chamber 64, defined partially by the operating puffer cylinder 48, and disposed below the working face of the piston 47. During this time, the contacts 32, 33 remain in engagement by virtue of the lost-motion connection 41 (FIG. 3B).

Further downward opening motion of the insulating operating rod 22 and the attached piston rods 46 raises the pressure of the fluid within the pressure chamber 64 to an extent sufficient to effect arc extinction. At this time, the flange 39a of the actuating sleeve 39 picks up the flange portion 40 associated with the movable contact rod 33, and drives the movable contact rod 33 downwardly, causing the separation therefrom from the stationary contact 32 and drawing the arc 42, as illustrated in FIG. 7. The fluid under pressure within the pressure chamber 64 passes downwardly through the apertures 60, 61 provided in the contact plate 62, and passes through the orifice restriction 44 and into engagement with the arc 42 effecting the latter's rapid extinction. The movable contact rod 33 moves downwardly to the fully open-circuit position, as illustrated by the dotted open position 65 of FIG. 3A.

During the closing operation, the insulating operating rod 22 is moved upwardly. This causes, through the actuating sleeve 39, upward movement of the movable contact rod 33, the flange portions 39a, 40 remaining in engagement by the biasing action exerted by the compression springs 34, 35. The movable contact rod 33 moves upwardly and strikes the stationary contact 32. Additional upward closing movement of the actuating sleeve 39 is possible by virtue of the lost-motion connection 41, the compression springs 34, 35 providing the requisite contact pressure between the separable contacts 32, 33. During the closing operation, the piston 47 has been moved upwardly by upward closing movement of the piston rods 46.

In the fully closed-circuit position of the interrupter, the current passes from the movable disconnecting contact 4, through the terminal plate 66 (FIG. 3A), through the conducting puffer operating cylinder 48, stationary contact plate 62, stationary contact 32, movable contact 33, collecting fingers 50 (FIG. 3B), flange portion 51, flange portion 67 to terminal plate 53. The current then passes to the laterally extending movable disconnect contact 5.

Although any suitable arc-extinguishing fluid may be used within the casing 23, it is preferred to use a highly effective arc-extinguishing fluid, such as sulfur hexafluoride ($SF_6$) or selenium hexafluoride ($SeF_6$), or one or both of the foregoing gases admixed with air, carbon dioxide, argon, helium or nitrogen. Other fluids may, of course, be used, as well known by those skilled in the art. For certain applications, however, suitable liquids, such as oil, or other mediums, even air, may be employed as the arc-extinguishing fluid.

From the foregoing description of the invention, it will be apparent that there is provided a compact, simple, and highly effective arc-extinguishing structure 68 comprising relatively separable contact structure 29, 30 and the associated puffer structure 31. The piston 47, associated with the puffer structure 31, is actuated by the movable contact mechanism directly, a lost-motion connection 41 being provided, so that the piston 47 is operable prior to contact part, so that adequate fluid pressure will be built up within the pressure chamber 64 prior to contact separation.

For certain applications, a modified orifice structure 69, such as illustrated in FIG. 8, may be employed. Here, there is relatively small clearance between the movable contact 33 and the orifice opening 70 and the skirt portion 70a is longer than the skirt portion 43a of the orifice structure 43 of FIG. 7.

The orifice construction illustrated in FIG. 8 was by far the most effective of the three orifice constructions shown in FIGS. 7–9 because of the the long skirt portion 70a and relatively close clearance between the orifice opening 70 and the movable contact 33. This close clearance helped to maintain the pressure above the moving contact whereas the larger clearance, shown in FIG. 9, somewhat caused less pressure because of the more rapid escape of the gas. In other words, the orifice in FIG. 8 held the gas back more than in FIG. 9 and hence when the moving contact 33 passed beyond the orifice opening, there would be more gas to go past the arc 42 and the velocity of the gas flow would be greater. The long skirt confines the gas around the moving contact and arc more than the orifice, as shown in FIG. 7.

FIG. 9 illustrates another modified type of orifice structure, generally designated by the reference numeral 71, which is effective for other circuit-interrupting applications and having larger contact diameters 32a, 33a, as shown.

As illustrated in FIGS. 1 and 2, the compact arc-extinguishing unit 68 of the present invention is adaptable for three-pole application and for the use of a common actuating mechanism. The three-pole structure may be truck-mounted, and adapted for employment with metal-clad switchgear, such as illustrated in FIG. 2.

The structure under consideration is inexpensive, simple, self-contained, and non-demonstrative when interrupting power currents.

The arc-extinguishing structure 68 has been tested in the laboratory, and has been found to be highly effective. It has interrupted 17,500 amperes. Generally, it is suitable for apparatus of 15 kv. rating, or thereabouts. However, it is to be clearly understood that the circuit-interruping structure of the present invention is adaptable for higher or lower-current and voltage applications where suitable dimensioning of the parts are made.

The piston 47, being driven by the insulating piston rods 46, attached to the movable operating rod 22, builds up the fluid pressure prior to contact separation. It will be noted that all of the opening energy is imparted to motion of the puffer piston 47, and this builds up gas pressure before the arc 42 is drawn, and before the moving contact 33 unplugs the orifice structure 43. With this disclosed arrangement, the arc is not drawn in position for interruption until sufficient pressure is built up to effect deionization. Also the speed of drawing the arc is increased, which decreases useless arcing and contact burning. It will be noted that the contact biasing springs 34, 35 assist the opening accelerating springs of the mechanism in causing high-speed opening movement of the operating rod 22 and the connected piston structure 47. In the closed-circuit position of the interrupter, as mentioned, the biasing springs 34, 35 provide the desired contact pressure.

It will be apparent to those skilled in the art that the pole-units A, B and C are adaptable for applications where external main contacts are desired for large values of continuous current-carrying duty. The delayed arcing contact parting permits transfer of the current from the external mains, when they are used, to the internal arcing contacts. By the use of external main contacts, not shown, which shunt the arcing contacts, the interrupter may be adapted for high values of continuous operating current.

As indicated in FIGS. 7–9, arcing 42 occurs on the upstream side of the orifice structures 43, 69 and 71 assisting in building up pressure within the pressure chamber 64 prior to unplugging of the orifice restriction. During heavy-fault-current interruption, such pressure may continue following unplugging of the orifice by the movable contact 33.

Although there have been shown and described specific interrupting structures, it is to be clearly understood that the same were merely for the purpose of illustration, and that changes and modifications may readily be made therein by those skilled in the art without departing from the spirit and scope of the invention.

We claim as our invention:

1. A circuit interrupter of the fluid-blast type including a relatively stationary contact and a cooperable movable contact separable to establish an arc, a puffer mechanism including a relatively stationary conducting puffer operating cylinder and a movable piston movable therein, the relatively stationary puffer operating cylinder supporting said relatively stationary contact adjacent one end thereof, said conducting puffer operating cylinder having one or more openings therein, operating means for actuating said movable contact to the open-circuit position, one or more piston rods passing through said one or more openings connected to the movable piston at one end and to the operating means at the other end, and the one or more piston rods and the piston moving in the opening direction of the movable contact during the opening operation of the circuit interrupter to effect thereby a blast of fluid out of the relatively stationary puffer operating cylinder toward said arc to effect the extinction thereof.

2. A circuit interrupter of the fluid-blast type including a relatively stationary contact and a cooperable movable contact separable to establish an arc, a puffer mechanism including a relatively stationary conducting puffer operating cylinder and a movable piston movable therein, the relatively stationary puffer operating cylinder supporting said relatively stationary contact adjacent one end thereof, said conducting puffer operating cylinder having one or more openings therein, operating means for actuating said movable contact to the open-circuit position, means defining a lost-motion connection between said operating means and said movable contact so that a time delay occurs between the initiation of said operating means and the drawing of said arc, one or more piston rods passing through said one or more openings connected to the movable piston at one end and to the operating means at the other end, and the one or more piston rods and the piston moving in the opening direction of the movable contact during the opening operation of the circuit interrupter to effect thereby a blast of fluid out of the relatively stationary puffer operating cylinder toward said arc to effect the extinction thereof.

3. The combination in a fluid-blast circuit interrupter of a puffer mechanism including a relatively stationary conducting puffer operating cylinder, a movable piston movable within said puffer operating cylinder, a pressure-generating chamber defined by the movable piston and the inner walls of said relatively stationary puffer operating cylinder, an orifice structure defining an opening out of said pressure-generating chamber, a relatively stationary contact supported by said relatively stationary puffer operating cylinder and disposed on the inlet side of said orifice structure, said conducting puffer operating cylinder having one or more openings therein, a movable contact rod movable through said orifice structure and into engagement with said relatively stationary contact during the closing operation, operating means for actuating said movable contact rod, piston-rod means interconnecting said movable piston and said operating means, said piston rod means passing through said one or more openings, and the movable piston movable in the same direction as the movable contact during the opening stroke to raise the pressure within said pressure-generating chamber to force fluid through said orifice structure to bring about arc extinction.

4. A circuit interrupter of the fluid-blast type including a relatively stationary contact and a cooperable movable contact separable to establish an arc, a puffer mechanism including a relatively stationary puffer operating cylinder and a movable piston movable therein, movable operating rod means, a lost-motion connection between said movable contact and said movable operating rod means, spring means biasing the movable contact to the closed position, and piston-rod means interconnecting said movable piston and the movable operating rod means, and the arrangement functioning to build up fluid pressure prior to arc establishment.

5. A circuit interrupter of the fluid-blast type including a relatively stationary contact and a cooperable movable contact separable to establish an arc, a puffer mechanism including a relatively stationary puffer operating cylinder and a movable piston movable therein, movable operating rod means, a lost-motion connection between said movable contact and said movable operating rod means, spring means biasing the movable contact to the closed position, piston-rod means interconnecting said movable piston and the movable operating rod means, and the arrangement functioning to build up fluid pressure prior to arc establishment, and the movable piston being movable in the same direction as the movable contact during the opening operation.

6. The combination in a fluid-blast circuit interrupter of a puffer mechanism including a relatively stationary puffer operating cylinder, a movable piston movable within said puffer operating cylinder, a pressure-generating chamber defined by the movable piston and the inner walls of said relatively stationary puffer operating cylinder, an orifice structure defining an opening out of said pressure-generating chamber, a relatively stationary contact supported by said relatively stationary puffer operating cylinder and disposed on the inlet side of said orifice structure, a movable contact rod movable through said orifice structure and into engagement with said relatively stationary contact during the closing operation, operating means for actuating said movable contact rod, means defining a lost-motion connection between said movable contact rod and said operating means, piston-rod means interconnecting said movable piston and said operating means, and the movable piston movable in the same direction as the movable contact during the opening stroke to raise the pressure within said pressure-generating chamber to force fluid through said orifice structure to bring about arc extinction.

7. The combination in an elongated tubular fluid-blast circuit interrupter of an elongated tubular insulating casing, a puffer mechanism including a relatively stationary conducting puffer operating cylinder disposed adjacent one end of said tubular insulating casing, a relatively stationary contact supported by said relatively stationary conducting puffer operating cylinder, a movable contact movable during opening longitudinally toward the other end of said tubular insulating casing, a piston movable within the puffer operating cylinder, and means interconnecting said movable piston and said movable contact.

8. The combination in an elongated tubular fluid-blast circuit interrupter of an elongated tubular insulating casing, a puffer mechanism including a relatively stationary conducting puffer operating cylinder disposed adjacent one end of said tubular insulating casing, a relatively stationary contact supported by said relatively stationary conducting puffer operating cylinder, a movable contact movable during opening longitudinally toward the other end of said tubular insulating casing, a piston movable within the puffer operating cylinder, operating rod means for actuating said movable contact during the opening and closing operation, a lost-motion connection between said movable contact and said operating rod means, and a piston rod connected at one end to said movable piston and at the other end to said operating rod means, whereby the movable piston moves in the direction of contact opening movement during the opening operation.

9. The combination in an elongated tubular fluid-blast circuit interrupter of an elongated tubular insulating casing, a puffer mechanism including a relatively stationary puffer operating cylinder having an opening therethrough disposed adjacent one end of said tubular insulating casing, a relatively stationary contact supported by said relatively stationary puffer operating cylinder, a movable contact movable during opening longitudinally toward the other end of said tubular insulating casing, a piston movable within the puffer operating cylinder, operating rod means for actuating said movable contact during the opening and closing operation, a lost-motion connection between said movable contact and said operating rod means, a piston rod connected at one end to said movable piston and at the other end to said operating rod means, the piston rod passing through said opening in the puffer operating cylinder, whereby the movable piston moves in the direction of contact opening movement during the opening operation, and a relatively stationary orifice structure associated with said puffer operating cylinder through which the established arc is drawn.

10. A circuit interrupter of the fluid-blast type including a sealed gas-tight casing for enclosing a suitable arc-extinguishing gas, relatively stationary contact and a cooperable movable contact separable to establish an arc, a puffer mechanism including a relatively stationary puffer operating cylinder and a movable piston movable therein, the relatively stationary puffer operating cylinder supporting said relatively stationary contact, operating means for actuating said movable contact to the open-circuit position, one or more piston rods connected to the movable piston at one end and to the operating means at the other end, and the one or more piston rods and the piston moving in the opening direction of the movable contact during the opening operation of the circuit interrupter to effect thereby a blast of fluid out of the relatively stationary puffer operating cylinder toward said arc to effect the extinction thereof.

11. The combination in a fluid-blast circuit interrupter of a sealed gas-tight casing enclosing a suitable arc-extinguishing gas under pressure, a stationary puffer operating cylinder, a movable piston movable within said puffer operating cylinder, a pressure-generating chamber defined by the movable piston and the inner walls of said relatively stationary puffer operating cylinder, an orifice structure defining an opening out of said pressure-generating chamber, a relatively stationary contact supported by said relatively stationary puffer operating cylinder and disposed on the inlet side of said orifice structure, a movable contact rod movable through said orifice structure and into engagement with said relatively stationary contact during the closing operation, operating means for actuating said movable contact rod, piston-rod means interconnecting said movable piston and said operating means, and the movable piston movable in the same direction as the movable contact during the opening stroke to raise the pressure within said pressure-generating chamber to force fluid through said orifice structure to bring about arc extinction.

References Cited in the file of this patent

UNITED STATES PATENTS

| | | |
|---|---|---|
| 2,459,599 | Strom | Jan. 18, 1949 |
| 2,924,690 | Brown et al. | Feb. 9, 1960 |
| 2,979,591 | Friedrich | Apr. 11, 1961 |

FOREIGN PATENTS

| | | |
|---|---|---|
| 433,933 | Great Britain | Aug. 22, 1935 |
| 500,731 | Great Britain | Feb. 13, 1939 |
| 374,500 | Italy | Aug. 26, 1939 |